United States Patent [19]

Stone

[11] 3,998,785
[45] Dec. 21, 1976

[54] ANTI-FUNGAL AND/OR ANTI-BACTERIAL HARDWARE FOR INK PRINTING APPARATUS

[75] Inventor: Jerry F. Stone, Georgetown, Ky.

[73] Assignee: International Business Machines Corporation, Armonk, N.Y.

[22] Filed: Jan. 6, 1976

[21] Appl. No.: 646,791

Related U.S. Application Data

[63] Continuation of Ser. No. 478,986, June 12, 1974, abandoned.

[52] U.S. Cl. .............. 260/45.75 W; 260/45.75 R; 260/45.8 NT; 260/DIG. 38
[51] Int. Cl.² .................. C08K 5/47; C08K 5/34; C08K 5/39
[58] Field of Search .................... 15/252.075; 260/45.75 W, 45.75 R, 45.8 NS, 45.8 NT, DIG. 38, 40 P; 106/15 AF; 424/270, 273, 299, 302, 287, 245, 83

[56] References Cited
UNITED STATES PATENTS

| | | | |
|---|---|---|---|
| 2,874,732 | 2/1959 | Zepelovitch | 15/257.075 |
| 3,017,415 | 1/1962 | Sarett et al. | 260/302 |
| 3,085,042 | 4/1963 | Luginbuhl | 424/287 |
| 3,239,411 | 3/1966 | Leebrick | 260/45.75 |
| 3,785,985 | 11/1974 | Grand | 260/45.75 |
| 3,812,065 | 5/1974 | Minieri | 260/45.8 NT |
| 3,928,372 | 12/1975 | Bochis | 260/302 |

Primary Examiner—V. P. Hoke
Attorney, Agent, or Firm—John W. Girvin, Jr.; D. Kendall Cooper

[57] ABSTRACT

A printer, such as an ink jet printer, incorporates various hardware such as the ink supply tank, tubing, and ink drop gutter, as representative items, having components molded in the hardware which disinfect groups of micro-organisms which present problems, particularly in areas where ink has depleted. The techniques described lead to inactivation of vegetative bacteria and fungi and prevention of maturation of spores in those areas not in frequent control with the biocide component of the ink. Also mutant forms are prevented from developing in those areas where the biocide component concentration is below the effective lethal level.

6 Claims, 2 Drawing Figures

ANTI-FUNGAL AND/OR ANTI-BACTERIAL HARDWARE FOR INK PRINTING APPARATUS

This is a continuation, of application Ser. No. 478,986 filed 6/12/74, now abandoned.

BACKGROUND OF INVENTION AND PRIOR ART

A typical ink supply system for ink jet printing apparatus is described in the Kruspe, et al. patent case, Ser. No. 308,365, filed Nov. 21, 1972, having H. R. Kruspe, et al, as inventors, and entitled "Pressurizing System for Ink Jet Printing Apparatus." Ink circulating in a system of this nature has been subject to fungus and bacterial deterioration during operation of the system, while the ink usually contains a biocide, the surface areas not continually exposed to the biocide - containing ink tend to support fungus and/or bacterial growth thus clogging filters, etc. as growth debris is carried by the ink in the system.

SUMMARY OF THE INVENTION

In accordance with the present case, supply and ink circulating hardware elements are molded of a material which incorporates directly in the material anti-fungal and anti-bacterial components. Representative fungicides and/or bactericides are described in detail later in the present case. It has been determined that incorporation of these components in the hardware practically eliminates problems associated with fungus and/or bacteria growth in the total system due to inhibition and lethal effects of components.

OBJECTS

The primary object of the present invention is to provide an ink supply and recirculating system wherein fungicides and/or bactericides are incorporated directly in the ink hardware thereby eliminating to a considerable extent any problems associated with such contaminants.

The foregoing and other objects, features, and advantages of the invention will be apparent from the following more particular description of several preferred embodiments as illustrated in the accompanying drawings.

DRAWINGS

DETAILED DESCRIPTION

Figure 1:
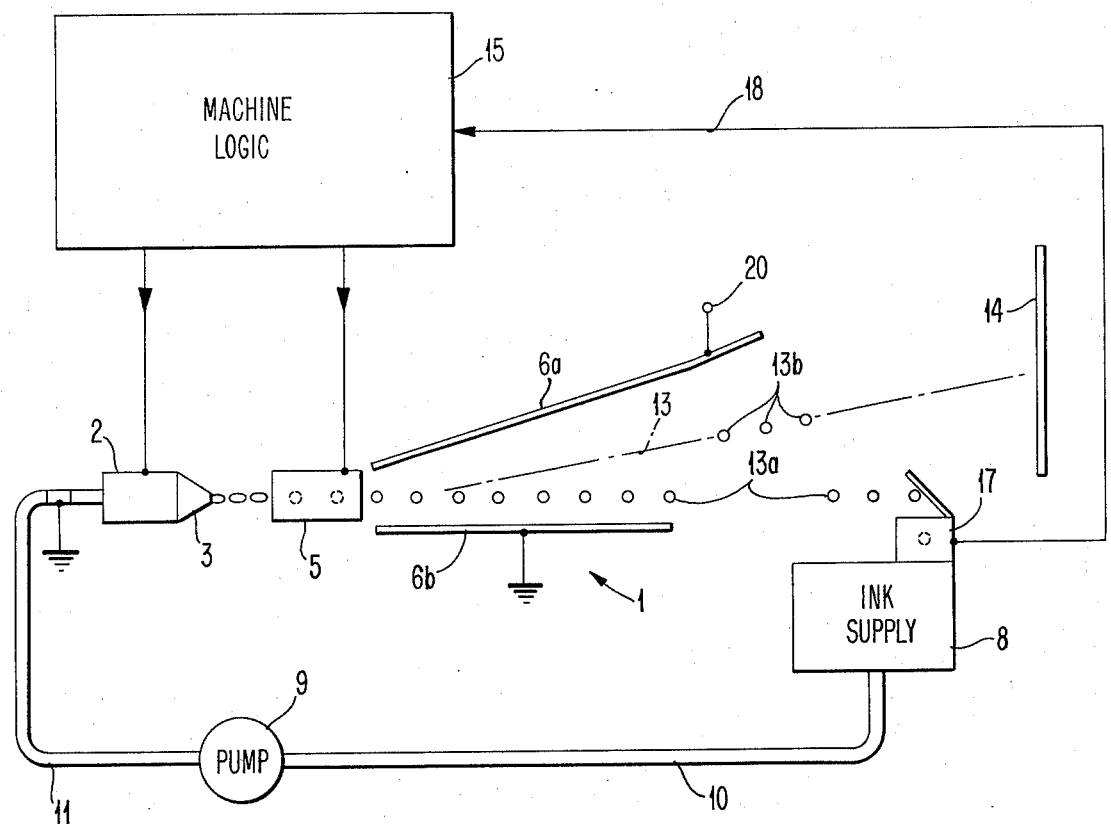
FIG. 1 is a block diagram of an ink jet printing apparatus incorporating anti-fungal and anti-bacterial hardware in accordance with the present invention.

FIG. 1 is a block diagram of an ink jet printing apparatus incorporating a nozzle assembly 1, a crystal 2, nozzle 3, charge electrode 5, deflection plates 6a and 6b, and having an associated ink supply 8 with pump 9, interconnected by tubing 10 and 11. Nozzle assembly 1 is positioned for formation, propulsion, charging, and deflection of drops in a stream 13 toward a document 14 to be printed. As is known in the art, drops are formed by vibration of crystal 2 under control of a crystal driver, not shown, and are propelled from nozzle 3. Drops are variably charged by charge electrode 5 in accordance with characters to be printed, both crystal 2 and charge electrode 5 being controlled by machine logic 15. Some feedback for synchronization of drop formation may be provided from gutter 17 to logic 15 by line 18. Following charging of individual drops, they are deflected by means of a potential from terminal 20 applied across plates 6a and 6b in accordance with the strength of the charge placed on the drops by electrode 5. Any drops not required for printing, such as drops 13a, are directed to gutter 17. Other drops, such as drops 13b, required for printing are directed along various paths to document 14. Drops landing in gutter 17 are returned to ink supply 8 and tubing 10 and 11 for recirculation through the system.

Figure 2:
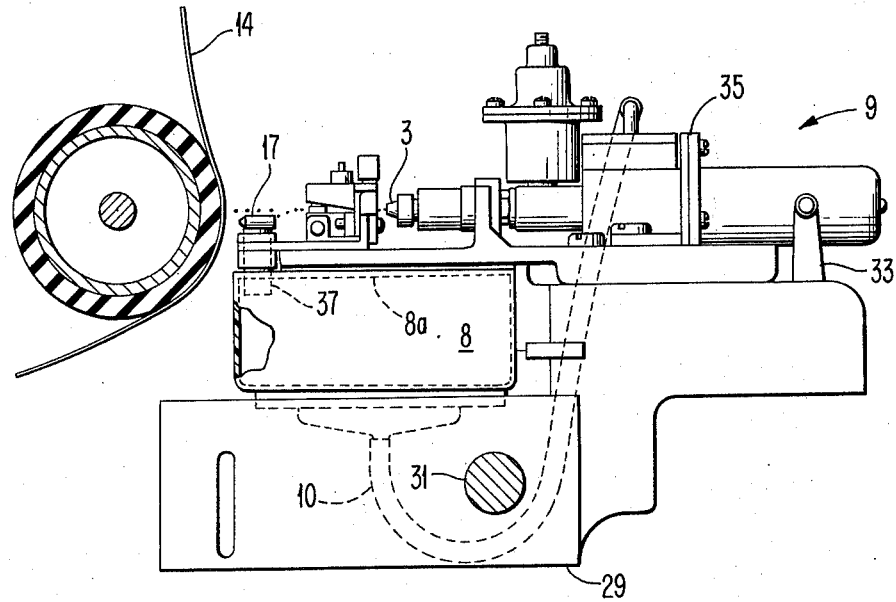
FIG. 2 illustrates in greater detail the ink supply and recirculating elements of the system of FIG. 1.

In FIG. 2, carrier 29 is mounted in a "Selectric"* printer (*IBM Trademark) frame similarly to a type head carrier, as illustrated in the Kruspe, et al case. Print shaft 31, in addition to supporting carrier 29, and as fully described in the Kruspe, et al case provides the rotating motion to refill pump 9 with ink, by rotating rocker arm 33 clockwise. Pump 9 is a bellows pump, but diaphragm or piston type pumps may be used instead.

Ink is drawn into a pump chamber in housing 35. The ink is drawn from reservoir 8 through a filter and through hose 10 into housing 35. In the version illustrated in FIG. 2, since the nozzle assembly is integral with pump 9, the separate tubing 11 of FIG. 1 is not required.

During the pump charge cycle described above a stream of ink under pressure flows out of nozzle 3 to gutter 17 and back to reservoir 8 thru aperture 37.

FUNGICIDE COMPONENT

Although the ink used in the system of FIGS. 1 and 2 customarily incorporates a fungicide, in accordance with the present case, a fungicide is also incorporated in various components of the ink supply and recirculating system, such as the ink reservoir 8, tubing 10, and gutter 17.

Fungal growth occurring on surfaces in the ink jet printer not protected by the fungicide component in the liquid ink continually contaminates the entire system thus imposing an additional burden on the system, i.e., eradicating actively growing fungus and its spores. Viable fungus spores can germinate in the humid environment of the upper surfaces 8a of reservoir 8. This reservoir surface is only periodically submerged and contacts the fungicide component incorporated into the ink, only during periodic machine replenishment of the ink. The quantity of ink being depleted exposes surface areas where fungal growth can occur. This area then is subject to receive microbiological debris in various forms and presents the largest contamination to the ink, via its support of growth forms. In the present case, reservoir 8 is formed of thermoplastic material incorporating, in situ, a fungicide proven effective against the species of Aspergillus and Penicillin fungi found to grow in such ink. The requirements for a fungicide in a system of this nature are:

1. Effectiveness in eradication.
2. Limited solubility in water.
3. Low solubility in organic solvents such as n-methyl-2-pyrrolidone, glycols, and glycolethers.
4. Thermal stability for molding with desired polymer.

The requirement for the thermoplastic is resistance to dye solvent(s) in the ink.

The procedure for incorporating the fungicide is to thoroughly mix the fungicide (powder forms preferred) in with the pellets of resin before molding.

The following examples are for the reservoir component. Other molding or extruding of tubing, diaphragms, gaskets, etc., may be similarly treated.

| Example 1: | Fungicide | |
| --- | --- | --- |
| | Metasol TK-100 (MERCK) 2-(4-thiazolyl)-benzimidazole | 0.5% |
| | Resin | |
| | Delrin 500 acetal homopolymer (DUPONT) | 99.5% |
| Example 2: | Fungicide | |
| | Maneb (DUPONT) manganous ethylenebis-dithiocarbamate | 1.0% |
| | Resin | |
| | Celanese Polyester 3310 | 99.0% |

An additional usable feature of certain biocides, such as Maneb, is the limited finite solubility in n-methyl-2-pyrrolidone (a 4% by weight component of most jet inks) which would furnish active fungal protection by slowly leaching from the system thereby providing a continuing secondary fungicide to the circulating ink system. Example: Solute uptake of n-methyl-2-pyrrolidone in polyethylene is pronounced as compared to polyester.

ANTI-BACTERIAL COMPONENT

Besides incorporating compounds that are primarily antifungal additives, other compounds that are antibacterial in nature may be incorporated in the material during the molding process. Additionally, certain biocides have both anti-fungal and anti-bacterial characteristics. Thus, stable organic bactericides have broad spectrum capabilities for controlling both bacteria and fungi.

Two examples using biocides in high-density polyethylene, incorporated as a copolymer in the flexible pressure tubing 10 or 11 are:

Results: (according to modified ERDL - Method Engineer Research and Development Laboratories for paint film plate inoculation tests)

Example 1: Biocide, 2-(4-thiazolyl)-benzimidazole, (Metasol TK-100 - Merck Lab., U.S. Pat. No. 3,017,415) exhibits adequate solubility in water (0.003 g/100 ml) to protect its surface and to contribute a "leaching" effect at a compounded 0.25% with polyethylene. The leaching media is agar-water in the test plate. Micro-organism tested - penicillium notatum.

Example 2: Biocide "Zinc Omadine" (Olin Chemicals, Zinc 2-pyridinethiol 1-oxide) does not exhibit "leaching" effect in aqueous due to its structure - a chelate complex of 1-hydroxypyridine-2-thione and zinc, unless an organic solvent is used in the immersing liquid (test broth or ink).

This is then solubilized by the glycol or pyrrolidone component of the ink - see plate test as in Example 01 previous. A concentration of 0.25% compounded in polyethylene prior to molding at 185° F was used. Test bacteria organisms from previous ink sources were rendered non-viable after exposure to the polyethylene surface for 14 days. Micro-organisms tested were Pseudonomas aeruginosa, and penicillium notatum.

Typical Hardware Formulations

Due to variations in the requirements on the components and the conditions under which they operate, it may be desirable to use various materials, depending upon the particular component being considered. In a typical system, the component formulations may be as follows:

1. Reservoir 8:
   Calcium carbonate filled polyester
2. Tubing 10:
   Polyethylene
3. Gutter 17:
   Two-piece polycarbonate
   Acrylic prototypes Further, the polyethylene tubing can incorporate one of the biocides having both anti-fungal and anti-bacterial characteristics.

While the invention has been particularly shown and described with reference to several preferred embodiments, it will be understood by those skilled in the art that various changes in form and detail may be made without departing from the spirit and scope of the invention.

What is claimed is:
1. An ink system comprising:
   a liquid ink incorporating an organic solvent; an ink containing element exhibiting anti-fungal characteristics, said ink containing element comprising:
   a thermoplastic resin material initially in pellet form exhibiting resistance to said organic solvent;
   a fungicide exhibiting the characteristics of an effective anti-microbial agent, insolubility in water, low solubility in said organic solvent, thermal stability for molding with said thermoplastic, and extended storage life;
   said fungicide being thoroughly mixed as fungicide powder in with the pellets of resin prior to molding into said ink containing element;
   said fungicide slowly leaching from the ink containing element upon contact therewith to provide a continuing fungicide to the ink system.
2. The system of claim 1, wherein:
   said thermoplastic material comprises an acetal homopolymer comprising about 99.5% of said element; and
   wherein said fungicide comprises 2-(4-thiazolyl)-benzimidazole that is about 0.5% of said element.
3. The system of claim 1, wherein:
   said thermoplastic material comprises a polyester that is about 99.0% of said element; and wherein
   said fungicide comprises manganous ethylenebis dithiocarbamate that is about 1.0% of said element.
4. The system of claim 3, wherein said ink incorporates n-methyl-2-pyrrolidone and said manganous ethylene bisdithiocarbamate has limited finite solubility in n-methyl-2-pyrrolidone thereby slowly leaching from the element to provide a continuing fungicide to a flowing ink system.
5. An ink system comprising:
   an aqueous ink;
   an ink supply or circulating element containing said ink, said element exhibiting anti-fungal and anti-bacterial characteristics, comprising:
   a high-density polyethylene; and
   the biocide, 2-(4-thiazolyl)-benzimidazole, exhibiting adequate solubility in water (0.003 g/100 ml) to protect its surface and to contribute a leaching effect when compounded at about 0.25% with said polyethylene.
6. An ink system comprising:
   a liquid ink incorporating an organic solvent;
   an ink supply or circulating element for containing said ink, said element exhibiting anti-fungal and anti-bacterial characteristics, comprising:
   a high-density polyethylene;

a biocide consisting of zinc 2-pyridinethiol 1-oxide, a chelate complex of 1-hydroxypyridine-2-thione and zinc, in a concentration of about 0.25% compounded in said polyethylene prior to molding and having a leaching effect when immersed in said organic solvent.

* * * * *